LUGENBELL & ARMSTRONG.
Ditching Plow.
No. 51,067. Patented Nov 21, 1865.
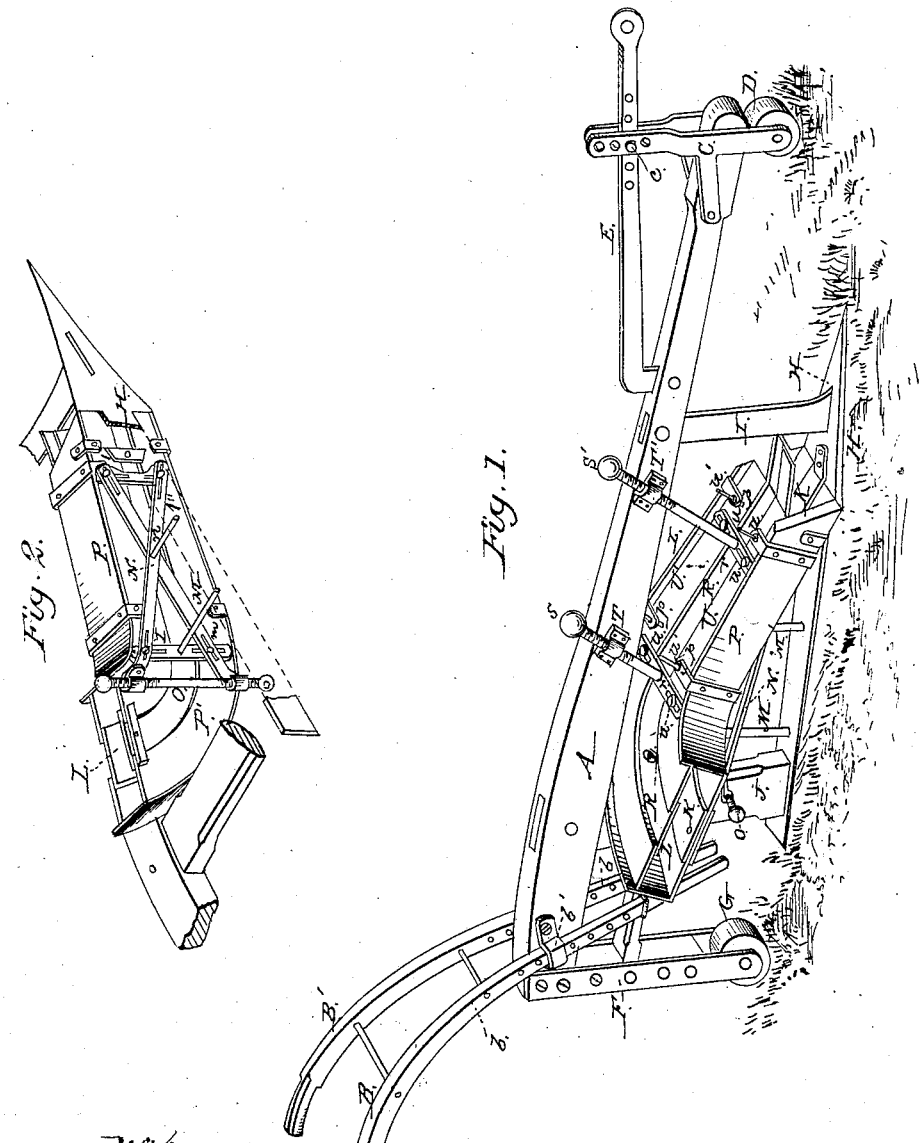

UNITED STATES PATENT OFFICE.

PETER LUGENBELL AND JAMES S. ARMSTRONG, OF GREENSBURG, INDIANA.

IMPROVED DITCHING-MACHINE.

Specification forming part of Letters Patent No. 51,067, dated November 21, 1865.

*To all whom it may concern:*

Be it known that we, PETER LUGENBELL and JAMES S. ARMSTRONG, both of Greensburg, Decatur county, Indiana, have invented a new and useful Improvement in Ditching-Plows; and we do hereby declare the following to be a full, clear, and exact description thereof, reference being had to the accompanying drawings, making part of this specification.

Our invention relates to a simple provision for cutting an open ditch or drain of any desired width or depth and with a comparatively small expenditure of power.

Figure 1 is a perspective view of a plow embodying our improvements. Fig. 2 is an under side view of the share and discharging-chute.

A represents a beam, having handles B B', adjustable in height by means of perforations $b$ and pins $b'$. The fore end of the beam has a hanger, C, in the lower end of which is journaled a roller, D.

The hanger is adjusted in height by means of a perforated bar, E, hinged to the beam, and a pin, $c$.

F is a hanger, which depends rigidly from the rear part of the beam, and holds a roller, G, whose lowest portion is in a line with the share of our plow.

H is a share, consisting of a flat spear-headed sheet of iron or steel, and secured rigidly a suitable distance below the beam by means of a knife-edged colter, I, and a sheath, J.

Attached to the top of the share H immediately in the rear of the spear-head, whence it slopes upward and rearward, is a floor-strip, K, of our discharging-chute L.

From the share H arise standards M M', which support an expansible frame or tram N in the form of a letter X. The tram N is susceptible of being expanded, or of being contracted about its center-bolt $n$, by means of a right and left screw, O.

P P' are angle-irons, forming the sides and lower corners of the chute, and pivoted to the tram N at 1 1' 1'' 1'''. By turning the screw O to the right or to the left the side pieces, P P', are caused to approach or to recede, so as to impart a less or greater width to the chute. The front ends of the pieces P P' are beveled inward, so as to afford chisel or cutting edges.

The top Q of the chute is adjustable up or down, so as to cut a thicker or thinner slice, and is also adjustable in pitch, so as to afford the proper easement or vantage to the slice. The said top is composed as follows: R is a strip of iron or steel, suspended by two screws, S S', which occupy nuts T T' on the beam. The strip R has slotted ears $r$, which receive pins $u$ upon strips U U', which have rods $u'$, which occupy perforated ears $p$ projecting from the side pieces, P P'. This connection with said side pieces enables them to be drawn toward or from each other by the same movement which contracts and expands the sides. The entire congeries of parts or strips composing the chute are bent to the right or left, as the case may be, so as to discharge the slice of earth on one side of the ditch.

The strips which compose the top of the chute are bent or deflected upward, so as to bring them parallel, or nearly so, with the share.

We claim herein as new and of our invention—

1. The combination of the excavating-share H and sides P P' of the side discharging-chute, L, when said sides are formed in front with cutting-edges, and all arranged to operate as and for the purposes herein set forth.

2. The arrangement of the parts H, M, M', N, $n$, O, P, P', Q, and S S', or their mechanical equivalents, for expanding and contracting the chute and securing its free discharge or delivery, substantially as set forth.

3. The arrangement of parts A, B, B', $b$, $b'$, C, D, E, F, and G, for enabling an excavating and discharging apparatus to cut a ditch of any desired uniform depth.

In testimony of which invention we hereunto set our hands.

PETER LUGENBELL.
JAMES S. ARMSTRONG.

Witnesses:
GEO. H. KNIGHT,
WM. A. MOORE.